United States Patent
Wang et al.

(10) Patent No.: US 8,224,652 B2
(45) Date of Patent: Jul. 17, 2012

(54) SPEECH AND TEXT DRIVEN HMM-BASED BODY ANIMATION SYNTHESIS

(75) Inventors: Lijuan Wang, Beijing (CN); Lei Ma, Beijing (CN); Frank Kao-Ping Soong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 12/239,564

(22) Filed: Sep. 26, 2008

(65) Prior Publication Data

US 2010/0082345 A1    Apr. 1, 2010

(51) Int. Cl.
*G10L 21/00* (2006.01)
(52) U.S. Cl. ........................ 704/275; 704/260
(58) Field of Classification Search .................. 704/235, 704/260, 257, 270, 275
See application file for complete search history.

(56) References Cited

U.S. PATENT DOCUMENTS

| | | | |
|---|---|---|---|
| 6,122,616 A * | 9/2000 | Henton | 704/258 |
| 6,130,679 A * | 10/2000 | Chen et al. | 345/473 |
| 6,330,023 B1 * | 12/2001 | Chen | 348/14.13 |
| 6,330,539 B1 * | 12/2001 | Takayama et al. | 704/275 |
| 6,366,885 B1 | 4/2002 | Basu et al. | |
| 6,665,643 B1 * | 12/2003 | Lande et al. | 704/266 |
| 6,735,566 B1 * | 5/2004 | Brand | 704/256 |
| 6,999,084 B2 * | 2/2006 | Mochizuki et al. | 345/473 |
| 7,076,430 B1 * | 7/2006 | Cosatto et al. | 704/275 |
| 7,123,262 B2 | 10/2006 | Francini et al. | |
| 7,133,535 B2 | 11/2006 | Huang et al. | |
| 7,168,953 B1 | 1/2007 | Poggio et al. | |
| 7,353,177 B2 | 4/2008 | Cosatto et al. | |
| 2003/0149569 A1 * | 8/2003 | Jowitt et al. | 704/275 |
| 2006/0290699 A1 | 12/2006 | Dimtrva et al. | |
| 2007/0168863 A1 | 7/2007 | Blattner et al. | |

OTHER PUBLICATIONS

Mana, et al., "HMM-based Synthesis of Emotional Facial Expressions during Speech in Synthetic Talking Heads", ICMI'06, Nov. 2-4, 2006, Banff, Alberta, Canada, ACM, pp. 380-387.
Cao, et al., "Expressive Speech-Driven Facial Animation", ACM Transactions on Graphics, vol. V, No. N, pp. 1-23.
Sargin, et al., "Combined Gesture-Speech Analysis and Speech Driven Gesture Synthesis", Multimedia and Expo, 2006 IEEE International Conference on Volume, Issue, Jul. 9-12, 2006, pp. 893-896.
Sargin, et al, "Prosody-Driven Head-Gesture Animation", Acoustics, Speech and Signal Processing, 2007, ICASSP 2007, IEEE International Conference on vol. 2, Issue, Apr. 15-20, 2007 pp. II-677-II-680.

(Continued)

*Primary Examiner* — Abul Azad
(74) *Attorney, Agent, or Firm* — Lyon & Harr, LLP; Mark A. Watson

(57) ABSTRACT

An "Animation Synthesizer" uses trainable probabilistic models, such as Hidden Markov Models (HMM), Artificial Neural Networks (ANN), etc., to provide speech and text driven body animation synthesis. Probabilistic models are trained using synchronized motion and speech inputs (e.g., live or recorded audio/video feeds) at various speech levels, such as sentences, phrases, words, phonemes, sub-phonemes, etc., depending upon the available data, and the motion type or body part being modeled. The Animation Synthesizer then uses the trainable probabilistic model for selecting animation trajectories for one or more different body parts (e.g., face, head, hands, arms, etc.) based on an arbitrary text and/or speech input. These animation trajectories are then used to synthesize a sequence of animations for digital avatars, cartoon characters, computer generated anthropomorphic persons or creatures, actual motions for physical robots, etc., that are synchronized with a speech output corresponding to the text and/or speech input.

16 Claims, 3 Drawing Sheets

OTHER PUBLICATIONS

Chen, et al., "Text to Avatar in Multi-modal Human Computer Interface", Proceedings of Asia-Pacific CHI 2002 (APCHI2002), 2002, pp. 6.

Muller, et al., "Face-to-Face With Your Assistant Realization Issues of Animated User Interface Agents for Home Appliances", Computers and Graphics 25 (2001), No. 4, pp. 593-600.

Tokuda, et al., "The HMM-based Speech Synthesis System (HTS) Version 2.0", 6th ISCA Workshop on Speech Synthesis, Bonn, Germany, Aug. 22-24, 2007, pp. 6.

Munhall, et al., "Visual prosody and speech intelligibility: Head movement improves auditory speech perception," Psychological Science, vol. 15, No. 2, pp. 133-137, Feb. 2004.

Graf, et al., "Visual prosody: Facial movements accompanying speech," in Proc. of IEEE International Conference on Automatic Faces and Gesture Recognition, Washington, D.C., USA, May 2002, p. 396-401.

Busso, et al., "Natural head motion synthesis driven by acoustic prosodic features," Computer Animation and Virtual Worlds, vol. 16, No. 3-4, pp. 283-290, Jul. 2005.

Brand, M., "Voice puppetry," in Proc. of the 26th annual conference on Computer graphics and interactive techniques (SIGGRAPH 1999), New York, NY, USA, 1999, pp. 21-28.

H. McGurk and J. W. MacDonald, "Hearing lips and seeing voices," Nature, vol. 264, pp. 746-748, Dec. 1976.

Fagel, S., "Merging methods of speech visualization," ZAS Papers in Linguistics 40, pp. 19-32, 2005.

Wu, et al., "Real-time Synthesis of Chinese Visual Speech and Facial Expressions using MPEG-4 FAP Features in a Three-dimensional Avatar," In Proc. of Interspeech 2006, pp. 1802-1805.

Wang, et al., "Real-Time Bayesian 3-D Pose Tracking," IEEE Transaction on Circuits and Systems for Video Technology, vol. 16, 1533-1541, Dec. 2006.

Hofer, et al., "Speech driven head motion synthesis based on a trajectory model," in Proc. of SIGGRAPH, 2007.

Tamura, et al. "Text-to-audio-visual speech synthesis based on parameter generation from HMM," in Proc. Of Eurospeech, 1999, pp. 959-962.

* cited by examiner

SPEECH AND TEXT DRIVEN HMM-BASED BODY ANIMATION SYNTHESIS

BACKGROUND

1. Technical Field

An "Animation Synthesizer" provides various techniques for providing automated body animation synthesis, and in particular, various techniques for using trainable probabilistic models derived from audio/video inputs of synchronized human speech and motion to drive new avatar animations based on arbitrary text and/or speech inputs.

2. Related Art

Virtual assistants, also called avatars, are virtual characters that are often used to facilitate natural and interactive human-machine communication. The role of the avatar depends on its applications: it can act as a guide, an assistant, or an information presenter, etc. The avatar appearance can be anthropomorphic (i.e., human characteristics) or cartoon-like, in a 2-D or 3-D form, depending on the output device (PC, PDA, cell phone, digital television, etc.). One advantage to using avatars is to make the user-machine interaction more natural by giving the user a sense of communicating with a real human agent. This sense can be enforced by mimicking the human-human communication faithfully, i.e., letting the avatar express realistic emotions through its facial motions and body gestures.

Unfortunately, to naturally manipulate an avatar to provide realistic facial expressions and/or body motions is generally a difficult task. For example, conventional speech motion synthesis techniques generally operated to synthesize facial motion that is synchronized with input speech. Synchronization is often achieved by breaking a sample speech signal into small units, such as phonemes, that are mapped to a set of lip poses. Then, given a new speech input that is also broken down into phonemes, the corresponding lip poses from the sample speech can then be used to generate facial animations by concatenating lip poses corresponding to the phonemes of the new speech signal.

Various improvements to this basic technique for animating facial motions based on input speech have been proposed in recent years. For example, rather than considering individual phonemes for modeling or animating lip motion, co-articulation of phonemes, generally on the order of about 10 consecutive phonemes, are evaluated to determine appropriate lip motions for animating such motion relative to a speech input.

More advanced animation techniques create compact statistical models of face motion using machine learning techniques such as Hidden-Markov Models (HMM) and Gaussian mixtures. Such techniques generally use these statistical models to develop a mapping from voice to face. Models are generally learned from a face's observed dynamics using techniques that consider factors such as position and velocity of facial features to learn a probability distribution over a set of different facial configurations. The resulting model is then used to provide animation of models based on new speech inputs.

Another example of speech-based animation techniques uses an input speech utterance to automatically synthesize matching facial motions. Animation is accomplished by first constructing a data structure referred to as an "Anime Graph" using a large set of recorded motions and associated speech. Lip-synching using co-articulation considerations is then provided by using a constrained search of the "Anime Graph" to find the best facial motions for each phoneme or group of co-articulated phonemes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, an "Animation Synthesizer" as described herein, provides various techniques for enabling automatic speech and text driven animation synthesis. The Animation Synthesizer uses a trainable probabilistic model (also referred to herein as an "animation model") for selecting animation motions based on an arbitrary text and/or speech input. These animation motions are then used to synthesize a sequence of animations for digital avatars, cartoon characters, computer generated anthropomorphic persons or creatures, actual motions for physical robots, etc., that are synchronized with a speech output corresponding to the arbitrary text and/or speech input.

The trainable probabilistic model used by the "Animation Synthesizer" is a probabilistic model such as, for example, a Hidden Markov Model (HMM), an Artificial Neural Networks (ANN), etc., that probabilistically explains motions (facial and/or body) extracted from one or more inputs comprising a synchronized speech and motion source. Examples of a synchronized speech and motion source include a live audio/video feed of a person talking and moving one or more body parts and/or making facial expressions, or a pre-recorded audio/video source, such as, for example, a newscast, a movie, or any other audio/video recording featuring either an entire person, or some part of a person that is sufficient to allow body part and/or facial motion analysis relative to the accompanying speech signal.

More specifically, given the aforementioned types of inputs for training, the synchronized motion and speech of those inputs is probabilistically modeled at various speech levels, including, for example, sentences (or multiple sentences), phrases, words, phonemes, sub-phonemes, etc., depending upon the available data, and the motion type or body part being modeled. Note that the duration of particular sentences, phrases, words, phonemes, etc. can also be modeled in order to account for differences in speaking speeds (e.g., a fast speaker or a slow speaker). Each body part, e.g., mouth (i.e., lip sync and other mouth motions), nose, eyes, eyebrows, ears, face, head, fingers, hands, arms, legs, feet, torso, spine, skeletal elements of a body, etc., can be modeled using either the same or separate inputs to create one or more probabilistic models. Further, while these speech/motion models can be updated or changed as often as desired, once trained, these models can be stored to a computer-readable medium for later use in synthesizing animations based on new text or speech inputs.

Once the trainable probabilistic model has been generated, the Animation synthesizer enables speech and text driven body animation synthesis by generating "animation trajectories" of different body parts from the previously trained probabilistic model. Information extracted from new speech and text inputs are used as a cue to animation modeling. The result is that the avatar's facial and body animations are automatically generated in a natural way according to the speech and content (e.g. the text and emotional content) the avatar is speaking. Further, in the case of physical robots, physical animation of the robots is accomplished by simply mapping the animation motions to physical control devices (e.g., artificial muscles, pneumatic controls, electro-mechanical actuators, etc.) Note that in various embodiments, duration information extracted from the new speech input is used to appropriately scale and synchronize motions modeled by the trainable probabilistic model to the new speech.

In view of the above summary, it is clear that the Animation Synthesizer described herein provides various techniques for using arbitrary text or speech inputs to synthesize animations for digital avatars and robots. In addition to the just described benefits, other advantages of the Animation Synthesizer will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
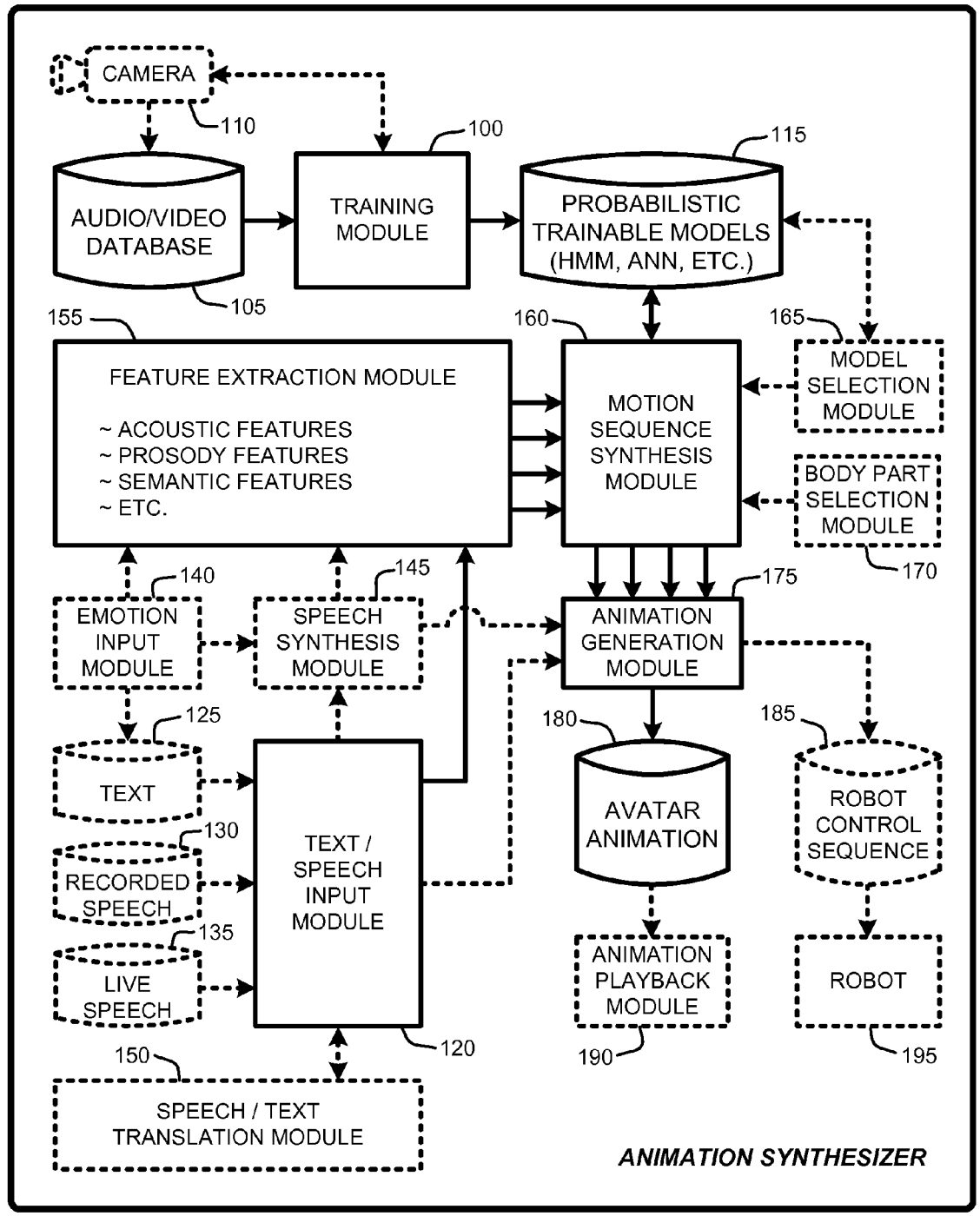
FIG. 1 provides an exemplary architectural flow diagram that illustrates program modules for implementing various embodiments of the Animation Synthesizer, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, an "Animation Synthesizer," as described herein, provides various techniques for using trainable probabilistic models, such as Hidden Markov Models (HMM), Artificial Neural Networks (ANN), etc., to provide speech and text driven body animation synthesis. The probabilistic models are trained using synchronized motion and speech inputs (e.g., live or recorded audio/video feeds of human subjects) at various speech levels, such as sentences, phrases, words, phonemes, sub-phonemes, etc., depending upon the available data, and the motion type or body part being modeled.

Training of the probabilistic models generally involves extracting motions (facial and/or body) from one or more inputs comprising a synchronized speech and motion source, then learning a probabilistic model that best explains those motions in view the corresponding speech. In general, one or more audio/video inputs are used to model different body parts to construct one or more trainable probabilistic models by using conventional motion capture and object recognition techniques to both identify and probabilistically model the motions of specific body parts relative to a corresponding synchronized speech input. Examples of a synchronized speech and motion source include a live audio/video feed of a person talking and moving or making facial expressions, or a pre-recorded audio/video source, such as, for example, a newscast, a movie, or other audio/video recording. Note that the duration of particular sentences, phrases, words, phonemes, etc. can also be modeled in order to account for differences in speaking speeds (e.g., a fast speaker or a slow speaker).

The Animation Synthesizer then uses the resulting probabilistic model for selecting, or more specifically, for "predicting," the appropriate animation trajectories for one or more different body parts (e.g., mouth (i.e., lip sync and other mouth motions), nose, eyes, eyebrows, ears, face, head, fingers, hands, arms, legs, feet, torso, spine, skeletal elements of a body, etc.) based on an arbitrary text and/or speech input based on an evaluation of the context, punctuation, and any emotional characteristics associated with that input. These animation trajectories are then used to synthesize a sequence of facial and/or body animations that are synchronized with a speech output corresponding to the text and/or speech input.

For example, in the case of a digital avatar or the like, a 2-D or 3-D mesh-type model, having known deformation rules, is used for constructing the animation from the selected animation trajectories. Note that for purposes of explanation, the following discussion will generally refer to animation of digital avatars. However, it should be clear that the animation techniques described herein are equally applicable to the animation of digital avatars, cartoon characters, computer generated anthropomorphic persons or creatures, actual motions for physical robots, electrical stimulation of specific muscles of a human user to cause muscle contractions corresponding to particular animation trajectories, etc.

Further, in various embodiments, duration information extracted from the new speech input is used to appropriately scale and synchronize motions modeled by the trainable probabilistic model to the new speech. For example, if the animation model is trained using a particular speaker, motions in that model can be temporally scaled to increase or decrease the speed of those motions to allow accurate synchronization to faster or slower speech inputs that are used as the basis for generating animations, as described herein.

Further, in various embodiments, the user is presented with a user interface for selecting one or more specific models for synthesizing animations from a new text or speech input. For example, a first facial motion model can be trained using an audio/video feed of a first person (or first group of people), while a second facial motion model can be trained using an audio/video feed of a second person (or second group of people). Another example of the use of multiple models is to use a hand motion model trained on the speech of a first person (or first group of people) in combination with a facial expression model trained on the speech of a second person (or second group of people). The user can then select from any of these models for use in generating animations.

However, in the simplest embodiment, all that is required is a speech or text input that is automatically processed by the Animation Synthesizer relative to the trainable probabilistic model to provide a basis for automatic animation synthesis. In other words, no user input is required beyond selecting or inputting the speech or text to be used as a basis for animation synthesis. Further, even the input of speech or text can be automated such that no user input is required at all. For example, in various embodiments, the Animation Synthesizer automatically animates an avatar using a text input from files such as received email messages. In this case, the animated avatar basically speaks the contents of the email (or other text data) using text to speech synthesis with synchronized animations of the face and/or body of the avatar (e.g., mouth, eyes (e.g., blinking and/or eye motions), eyebrow positions and motions, head motions, etc.), and/or animations of other body parts of the avatar being synthesized relative to the trainable probabilistic model or models.

1.1 System Overview:

As noted above, the "Animation Synthesizer," provides various techniques for using arbitrary text or speech inputs to synthesize animations for digital avatars and robots relative to one or more learned probabilistic models of synchronized speech and motion. The processes summarized above are illustrated by the general system diagram of FIG. 1. In particular, the system diagram of FIG. 1 illustrates the interrelationships between program modules for implementing various embodiments of the Animation Synthesizer, as described herein. Furthermore, while the system diagram of FIG. 1 illustrates a high-level view of various embodiments of the Animation Synthesizer, FIG. 1 is not intended to provide an exhaustive or complete illustration of every possible embodiment of the Animation Synthesizer as described throughout this document.

In addition, it should be noted that any boxes and interconnections between boxes that may be represented by broken or dashed lines in FIG. 1 represent alternate embodiments of the Animation Synthesizer described herein, and that any or all of these alternate embodiments, as described below, may be used in combination with other alternate embodiments that are described throughout this document.

In general, as illustrated by FIG. 1, the processes enabled by the Animation Synthesizer begin operation by using a training module 100 to process one or more audio/video inputs from an audio/video database 105. As noted above, the audio/video inputs comprising the audio/video database 105 include examples of speech synchronized to the motion of one or more body parts (e.g., a typical video recording or input of a person talking). Further, in various embodiments, the audio/video inputs of the audio/video database 105 may also be provided as a live input via a conventional video camera 110 or the like.

As discussed in further detail in Section 2.2, the training module 100 receives one or more audio/video inputs comprising synchronized speech and body motion. These inputs are then processed by the training module 100 to generate or learn one or more probabilistic trainable models 115 that provide a probabilistic explanation of the observed data. More specifically, probabilistic trainable models 115 (e.g., HMMs, ANNs, etc.) are learned that will generate the observed body motion sequences from the training data based on observations of various features of the corresponding synchronous speech. In general, these observations include speech characteristics such as acoustic features of the speech, prosody features of the speech, semantic features of the speech (e.g., context, part-of-speech (POS), emotional characteristics, etc.), etc.

These probabilistic trainable models 115 include probabilistic "animation units" that correspond specific motions of particular body parts to speech at various levels, including, for example, sentences (or multiple sentences), phrases, words, phonemes, sub-phonemes, etc., depending upon the available data, and the motion type or body part being modeled, and based on the extracted characteristics of the speech. Once trained, the probabilistic trainable models 115 are stored for later use by the Animation Synthesizer. However, it should be noted that the probabilistic trainable models 115 can be retrained, or new probabilistic trainable models can be learned at any time, by simply providing new audio/video inputs to the audio/video database 105, or by modifying parameters of the probabilistic modeling techniques, or the object recognition and tracking techniques associated with the probabilistic learning process.

In any case, as described in Section 2.4, once the probabilistic trainable models 115 have been learned from the training data, the Animation Synthesizer uses these models to generate new animation sequences for avatars or robots given an arbitrary text or speech input. Specifically, in one embodiment, a text/speech input module 120 receives an input of text 125, either typed or read from an electronic file or database. In additional embodiments, the text/speech input module 120 receives a speech input that is either recorded 130, or provided as a live input 135 via a microphone or other audio input device. Note that this speech input can also be provided as the audio portion of a typical video recording or live feed.

In the case where the text/speech input module 120 receives a text 125, the text/speech input module passes the input to a speech synthesis module 145 that uses conventional text-to-speech techniques to generate a speech signal from the text input. Such techniques are well known to those skilled in the art, and will not be described herein. In various embodiments, an emotion input module 140 allows the user to associate particular emotional characteristics or an emotional context with some or all of the text 125. For example, the user may with the speech synthesis module 145 to generate speech from the text 125 input that sounds happy, sad, angry, confused, etc.

Further, in various embodiments, a speech/text translation module 150 translates the text 125 input from one language to another prior to passing that text input to the speech synthesis module. In various embodiments, a user interface is associated with the speech/text translation module 150 to allow the user to specify or otherwise select the desired languages for translation. For example, by using conventional text or language translation techniques to translate an English text input to a Mandarin Chinese text input, the speech synthesis module 145 will generate Mandarin Chinese speech from the original English text input. In this case, the resulting animations will correctly model a Mandarin Chinese speaker that correctly speaks a Mandarin Chinese translation of the original English text input.

In addition, it should also be noted that in related embodiments, the Animation Synthesizer automatically translates a speech input in a first language to a speech output in a second language. In particular, in these embodiments, the speech/text translation module 150 receives a speech input, either live 135 or recorded 130, and performs speech-to-text processing of the input speech followed by a text-to-text translation of the original input, with the speech synthesis module 145 then performing text-to-speech synthesis in the new language.

Note also that various conventional techniques for direct speech-to-speech translation also exist. Consequently, in various related embodiments, such techniques are used to directly translate a live 135 or recorded 130 speech input from a first language to a second language without ever converting the speech input to text. Further, it should also be noted that many conventional computing devices, such as, for example, desktop, portable, or handheld computing devices, have sufficient computing power to perform either type of translation in real-time.

In any case, regardless of how the speech input to be used for animation synthesis is received or generated, that speech is provided to a feature extraction module 155 which processes that speech to extract various contextual and prosodic information from the speech. For example, the feature extraction module 155 will process the new text or speech input (i.e., 125, 130, 135, etc.) to determine speech characteristics such as acoustic features of the speech, prosody features of the speech, semantic features of the speech (e.g., context, part-of-speech (POS), emotional characteristics, etc.), etc. Since these are the same features that are extracted from speech during model training, selection of animation units from the probabilistic trainable models 115 is easily accomplished based on the analysis of the new speech input.

More specifically, once the feature extraction module 155 has extracted the speech characteristics from the new text or speech input (i.e., 125, 130, 135, etc.), this information is passed to a motion sequence synthesis module 160 that selects a corresponding sequence of animation units from the probabilistic trainable models 115.

In various embodiments, a user interface is provided via a model selection module 165 that allows the user to select one or more specific models to be used by the motion sequence synthesis module 160. For example, the user may prefer the use of a model trained on a very expressive speaker, or conversely, a model trained on a very sedate speaker. In related embodiments, a user interface is provided via a body part selection module 170 that allows the user to specify particular models to be used for particular body parts. Given these embodiments, particular motion characteristics and speaking styles from multiple speakers can be combined by the Animation Synthesizer to generate widely varying composite animations, depending upon the particular models chosen by the user.

In particular, once the motion sequence synthesis module 160 has selected a sequence of animation units from the probabilistic trainable models 115, these motions are passed to an animation generation module 175. The animation generation module 175 then combines the sequence of animation units. Further, in various embodiments, animation generation module 175 smoothes the transition from one animation unit to the next to provide more natural looking animations. In particular, these animation units are used to animate corresponding deformations of the 2-D or 3-D mesh avatar model, with the sequence of animations then being used to provide an avatar animation 180 that be provided for real-time or delayed playback via an animation module 190. Similarly, in the case of a robot, the animation generation module 175 scripts a sequence of robot controls (i.e., robot control sequence 185) that will cause corresponding parts of a robot 195 to perform motions corresponding to the animation sequence constructed by the animation generation module.

Note that in either case, the corresponding text or speech input (i.e., 125, 130, 135, etc.) is also provided to the animation generation module 175 so that the animation motions of the avatar or robot will be synchronized with that text or speech input. The end result of these processes is an animated avatar or robot that accurately lip syncs corresponding speech while performing natural facial and body motions. In other words, the avatar animation 180 (or robot control sequence 185) will include an audio/video rendering or control sequence of the avatar or robot that provides synchronized speech and motion.

2.0 Operational Details of the Animation Synthesizer:

The above-described program modules are employed for implementing various embodiments of the Animation Synthesizer. As summarized above, the Animation Synthesizer provides various techniques for using arbitrary text or speech inputs to synthesize animations for digital avatars and robots relative to one or more trainable probabilistic models of synchronized speech and motion. The following sections provide a detailed discussion of the operation of various embodiments of the Animation Synthesizer, and of exemplary methods for implementing the program modules described in Section 1 with respect to FIG. 1. In particular, the following sections examples and operational details of various embodiments of the Animation Synthesizer, including: an operational overview of the Animation Synthesizer; animation model training; text and/or speech inputs for animation synthesis; animation synthesis; and additional embodiments and considerations.

2.1 Operational Overview:

As noted above, the Animation Synthesizer-based processes described herein, provides various techniques for using arbitrary text or speech inputs to synthesize animations for digital avatars and robots relative to one or more trainable probabilistic models of synchronized speech and motion.

In general, the Animation Synthesizer automatically generates avatar or robot animations given speech and/or text as an input. Two basic components of the Animation Synthesizer enable these capabilities: 1) animation model training from synchronized examples of speech and motion; and 2) animation synthesis from an arbitrary text or speech input following model training.

2.2 Animation Model Training:

In general, animation model training involves adapting the framework of a probabilistic model based text-to-speech synthesis process to model "animation units" for various body parts (e.g., eyes, eyebrows, mouth, nose, ears, face, head, hands, arms, etc.). In other words, given one or more training inputs comprising synchronized speech and body motion, trainable probabilistic models are learned for "animation units" that correspond to speech at various levels, including, for example, sentences (or multiple sentences), phrases, words, phonemes, sub-phonemes, etc., depending upon the available data, and the motion type or body part being modeled.

For example, a nod of the head is typically synchronized with the utterance of the word "yes" in the English language. This synchronized motion and speech is captured during training of the learned probabilistic model. Then, during the subsequent animation process, an input of text or speech corresponding to the word "yes" will cause an animation in the avatar that includes a head nod (as well as lip sync motions and motions of other body parts, as appropriate, depending upon the motions covered by the learned probabilistic model).

Note that while the following discussion generally describes the use of a Hidden Markov Model (HMM), other models, such as, for example, Artificial Neural Networks (ANN), or other trainable or learned probabilistic models, can also be used to generate the probabilistic animation model.

The learned probabilistic models are generally trained on a fairly large training set in order to provide a robust model for synthesizing natural looking animations. For example, in the case of training an HMM-based probabilistic model of head a large audio-visual (A/V) database of one or more human speakers showing synchronous speech and motion is used to learn one or more HMM models of head movements.

As noted above, training can be performed at the sentence level, phrase level, word level, phoneme level, sub-phoneme level, etc. However, for purposes of explanation, assume that training of basic "animation units" of head motion is completed within a prosodic word. So, the head motion animation units are segmented in prosodic word boundaries and modeled as multi-state HMMs. The parametric features used in HMM modeling include both head motion features and acoustic features of the corresponding speech. The head motion features, e.g., sequences of Euler angles, are extracted from the video part of a large, pre-recorded A/V database. The acoustic features of the corresponding speech, such as F0 and RMS energy, for example, are extracted from the audio part of the A/V database.

Following a semantic analysis and prosody analysis of that speech, a full context label, including part of speech (POS), word accent, break level, emotion degree, etc., is generated for each head motion animation unit. Further, to overcome data sparseness problems, full context animation models are clustered using predictive analysis techniques, such as, for example, classification and regression trees (CART). In this manner, individual animation units can be placed or "clustered" in a more accurate overall motion sequence in the case where an individual animation unit might otherwise result in an appearance unnatural motion in the avatar or robot.

More specifically, one or more synchronized audio/video inputs are processed using object detection and recognition techniques in combination with probabilistic modeling techniques to learn probabilistic motions (i.e., "animation units") corresponding for each different body part, including, for example, lip sync motions, head motions, hand and/or finger motions, facial expressions, eye blink, etc. This modeling can be performed using any desired probabilistic speech/motion modeling techniques, and any number of audio/video training inputs. Examples of audio/video inputs include a video of a real human talking during a newscast or a movie, or other live or recorded audio/video input.

For example, in a tested embodiment of the Animation Synthesizer, head motions from a typical synchronized audio/video broadcast was used as an input to the model generation process. An example of a particular broadcast that was used in various tested embodiments is the "Voice-of-America" (VOA) video broadcast. One or more broadcast segments that included a newscaster or announcer were extracted from the VOA video broadcast and evaluated using conventional head pose tracking techniques. One example of such techniques is to obtain Euler angles of the head (e.g., mouth, eyes, eyebrows, facial expressions, head position, etc.) of the announcer in three dimensions, as noted above.

These head motions, which are assumed to be properly synchronized with the corresponding speech during the newscast, allow conventional speech acoustic features and prosody features, such as F0, energy, timing, part-of-speech, semantics, etc., to be considered in combination with head and/or other body motions to form a set of model training data. The HMM, or other trainable probabilistic model, is then used to model various head motions (relative to the synchronized speech input of the video broadcast) to construct a learned probabilistic model of temporal relationships between acoustic prosodic features of the speech and various head and/or body motions. Further, while these speech/motion models can be updated or changed as often as desired, once learned or trained, these models can be stored to a computer-readable medium for later use in synthesizing animations based on new text or speech inputs.

In other words, HMMs (or other trainable probabilistic models) are learned that will generate observed motion sequences from the training data based on the given observation of the prosodic features of the corresponding synchronous speech. This same information is then extracted from arbitrary speech inputs (or from speech synthesized from arbitrary text inputs) in order to construct animation sequences, as described in further detail in Section 2.4.

2.3 Text and/or Speech Input for Animation Synthesis:

As noted above, once the animation model or models have been trained, those models are then used by the Animation Synthesizer to provide animation synthesis corresponding to an arbitrary text or speech input. For example, in the animation synthesis portion of the Animation Synthesizer (see Section 2.4), a speech and/or text sample is input using conventional input devices. Examples of such inputs include live speech using a microphone, recorded speech from an audio input device or file, text from a text input device or file, or text input via optical character recognition techniques applied to an image of text (e.g., a scanned document or book).

In the case where a speech input is received, that speech can be evaluated directly to extract acoustic, prosodic, and contextual features that are then used in selecting particular "animation units" from the animation model. Then, as discussed in further detail in Section 2.4, that speech input can be used directly in combination with the trainable probabilistic model to synthesize animations of the avatar or robot.

However, any speech input can also be used as a basis for generating new speech (e.g., a different "speaker"). For example, conventional audio processing techniques, such as raising or lowering pitch or modifying other speech components (e.g., emotional context, speech prosody, etc.), can be used to change the input speech. Simple examples would be to make a female speaker sound like a male speaker, or an adult speaker sound like a child.

Further, in various embodiments, the speech input is converted to a text input using conventional speech recognition techniques, with conventional speech synthesis techniques then being used to construct a new wholly synthetic speech input from the text corresponding to the original speech input. Similarly, speech for use with the corresponding animation of the avatar can also be synthesized directly from a text-only input such as, for example, text typed by the user, or the contents of a text file, such as, for example, an email message or other digital file containing text data.

As noted above, in various embodiments, the user is provided with a user interface that allows the user to associate particular emotional characteristics or an emotional context with some or all of the text or speech input. For example, by selecting or assigning particular emotional characteristics with particular portions of a text input (or with a text input generated from a speech input) speech will be generated that sounds happy, sad, angry, confused, excited, etc.

These emotional characteristics are simply associated with some or all of the text using a user interface that allows the user to select from one or more emotional characteristics in a text-based or graphical user interface. For example, in the case of a graphical type interface, if the user wants some or all of the speech to sound happy, the user can select an image of a happy face (sometimes referred to as an "emoticon"). Similarly, the user can select the desired emotional context of some or all of the speech from a text menu of available emotional characteristics.

In various embodiments, these emotional characteristics are implemented as "emotion tags" that are manually or automatically embedded in a text input. For example, as with conventional HTML code that, when embedded in text can change the appearance of the text, emotion tags, such as, for example "<HAPPY>" or "<SAD>" can be embedded in particular locations within a text input to change the emotional context of particular portions of that text.

For example, in an HTML type framework, a particular text input such as:

"<HAPPY> I am very happy today! </HAPPY> <SAD> Yesterday I was not very happy. </SAD>"

will result in a synthetic speech input where the first sentence ("I am very happy today!") is synthesized as speech that sounds happy (and excited due to the use of an exclamation), while the second sentence ("Yesterday I was not very happy.") is synthesized as speech that sounds sad. Clearly, there are many different ways in which these types of emotional characteristics can be associated with particular text inputs, and the Animation Synthesizer described herein is not intended to be limited to the use of HTML-type emotion tags, as illustrated by the above example.

Further, as noted above, in various embodiments, the speech or text input is translated from one language to another prior to using that input for speech synthesis. In various embodiments, a user interface is provided that allows the user to specify or otherwise select the desired languages for translation. For example, by using conventional text or language translation techniques to translate an English text or speech input to a Mandarin Chinese text input, a Mandarin Chinese speech output can be generated from the original English text input. In this case, assuming that one or more of the probabilistic trainable models have been trained using Mandarin Chinese audio/video training data, the resulting animations will correctly model a Mandarin Chinese speaker that correctly speaks a Mandarin Chinese translation of the original English text input. See Section 2.5 for additional discussion of related translation-based embodiments of the Animation Synthesizer.

Further, it should also be noted that regardless of the language that the probabilistic trainable models have been trained on, by modeling facial and lip motions at the phoneme or sub-phoneme level, the probabilistic trainable model will generally allow correct lip sync to any speech in any language since the face and lips will take on the same general shape, positions, and movements to utter sounds corresponding to particular phonemes or sub-phonemes, regardless of the language used for training the probabilistic trainable model. However, other body motions, such as, for example, head nods corresponding to the English word "yes" may not be modeled properly unless the probabilistic trainable models are trained on the same language that is being used to drive the corresponding animation.

2.4 Animation Synthesis:

In general, animation is a sequential changing of 2-D or 3-D model parameters over time, which can be achieved using a variety of techniques, such as, for example, shape/morph target based techniques, bone/cage techniques, skeleton-muscle based systems, motion capture of points on face corresponding to a deformation models associated with a mesh model of the avatar, knowledge based solver deformation based techniques, etc. The Animation Synthesizer is capable of using any such techniques, so long as a mapping or correlation of the avatar mesh model or robot controls is provided to the motions modeled by the HMM or other probabilistic model is provided so that proper deformations of the parameterized 2-D or 3-D model (or robot) will be correctly synchronized with an arbitrary speech input.

For example, in the skeleton-muscle model, there are different types of "controllers," including, for example, virtual facial muscles for facial expression, virtual muscles for eye blink, and a virtual skeleton for head, hand, finger, or other body motions. Each controller controls the manner and displacement of vertices on the associated meshes. As such, virtual lip muscles can be used to control how wide the mouth of the avatar or robot opens. Similarly, body gestures or motions can be achieved by controlling the spatial positions of bones on the skeleton. Such techniques are known to those skilled in the art, and will not be described in detail herein.

In general, when synthesizing an animation from an arbitrary speech input (or speech input synthesized from an arbitrary text input or translation), the Animation Synthesizer generates a sequence of animation units from the probabilistic animation model that can be carried out separately. More specifically, the speech input is processed to generate a context-dependent label sequence based on the features extracted from the speech input. Since all of the animation units in the HMM-based animation model also have a context corresponding to the same basic features extracted from the speech input being used for animation synthesis, as described above, probabilistic selection of particular animation units from the HMM-based animation model is a straightforward process. Consequently, after all of the sub-part animations are generated by selection of the appropriate sequence of animation units, the full body animation of the avatar or robot is generated by integrating all of the sub-part animations together. As noted above, the full body animation can drive a virtual avatar or a robot for various applications.

For example, in synthesizing a head motion animation, for a given speech and/or text input, full context labels for each animation unit are generated and their corresponding HMM sequence can be constructed. As a result, the head motion trajectory can be generated. Further, since the animation of each phoneme, or sub-phoneme, is a consequence of specific movements associated with articulation of that phoneme, motions of lips, tongue, teeth and jaw will correspond to the specific phoneme or sub-phoneme (or entire word, phrase, sentence, etc.).

2.5 Additional Embodiments and Considerations:

The following paragraphs describe various additional embodiments of the Animation Synthesizer that are enabled in view of the discussions provided herein.

2.5.1 Real-Time Translations and Communications:

As noted above, the probabilistic animation models can be trained on any desired language, e.g., English, French, Mandarin Chinese, etc. Consequently, it should be noted that when combined with conventional language translation techniques, a text or speech input in one language can be used to provide animation for avatars in another language.

For example, assume that an animation model is trained using English language audio video inputs. Further, assume that a subsequent text or speech input is provided in Mandarin Chinese. Then, the Mandarin Chinese text or speech input can be translated to an English text input. Speech synthesis techniques are then applied to the resulting English text, with the resulting input then being used to animate the avatar. Alternately, as noted above, a speech input can be directly translated from speech in English to speech in Mandarin Chinese (or other language) using conventional speech translation techniques.

In other words, in this simple example, the input of a Mandarin Chinese text or speech input is automatically translated and used to animate an avatar that speaks the English translation of the Mandarin Chinese text input along with natural lip sync and other head and/or body motions corresponding to the spoken English, depending on the animation model being used.

Thus, depending upon the complexity of the avatar model, and the available computing power, the Animation Synthesizer can also be used for real-time communications that automatically translate a speech input in a first language to a speech output in a second language. A simple example of such embodiments would include speech-to-text processing of a speech input, followed by translation of the text, followed by text-to-speech synthesis. Alternately, direct speech-to-speech translation can also be used. In either case, the resulting speech drives synchronized animation of the avatar corresponding to the translated speech using the model-based animation techniques described herein.

In fact, assuming that a user's face has been sufficiently modeled, such that motions of the user's face can be animated using the techniques described herein, a user speaking Mandarin Chinese as an input can be used to produce a real-time synthesized English speech output using the user's own face (or other animated avatar). As a result, real-time multi-point video conferencing in multiple languages can be enabled where it appears that each user is speaking a different language to each of one or more other user's at different video endpoints.

2.5.2 Emotional Context of Animations:

As noted above, in various embodiments, any emotional characteristics associated a particular text input will also be used to control some portion of the motions and facial expressions of the animation. For example, assuming that a "happy" emotional context is associated with a particular text or speech input, the animation produced by the Animation Synthesizer will not only sound happy, but it will look happy, such as, for example, by making the avatar or robot smile while speaking.

Note that in order to ensure that the animation of the avatar matches the emotional context associated with a particular text input, specific emotional contexts with associated body motions and facial expressions can be specifically included in the probabilistic trainable model. However, assuming that a sufficiently large training sample covering a broad range of emotional contexts is used in training the animation models, and that the speech synthesizer accurately reproduces the emotional context of speech, the probabilistic trainable model will not need to specifically model particular emotional states or contexts since that context will be inherently associated with any speech that sounds happy, sad, excited, etc., without the model ever actually specifically considering anything more than the prosodic features of the actual speech being used to drive a particular animation.

2.5.3 Animation Model Selection:

As noted above, in various embodiments, a user interface is provided that allows the user to select one or more specific models to be used for animation synthesis. For example, the user may prefer the use of a model trained on a very expressive speaker, or conversely, a model trained on a very sedate speaker.

In related embodiments, a user interface is provided that allows the user to specify particular models to be used for particular body parts. For example, the user may prefer a model that was trained on a person that used emphatic hand gestures while speaking, or on a model that was trained on a person that used her hands to sign spoken language content using American Sign Language (ASL), or other hand signing language. Such embodiments allow animation of avatars (or robots) that will perform hand motions corresponding to sign language that will allow a deaf person to understand a corresponding speech input by viewing the hand motions of the avatar or robot. In this context, the animation of the avatar or robot is somewhat analogous to translation of one language to another.

2.5.4 Control of Physical Muscles in a Human User:

By mapping the nerve and muscle structure of a human user, particular muscles corresponding to a particular animation trajectory can be electrically stimulated in specific sequences and for specific periods of time using conventional muscle stimulation techniques to cause muscle contractions that result in actual body motions or facial expressions corresponding the selected animation trajectory. Control in this case would be conceptually similar to the control of a robot, as described above. Examples of the use of such techniques would be to allow a person that does not have voluntary control of his or her facial muscles, due to paralysis or other cause, to animate his or her face to correspond to real or synthesized speech, or to simply express emotion, such as a smile or a frown.

Figure 2:
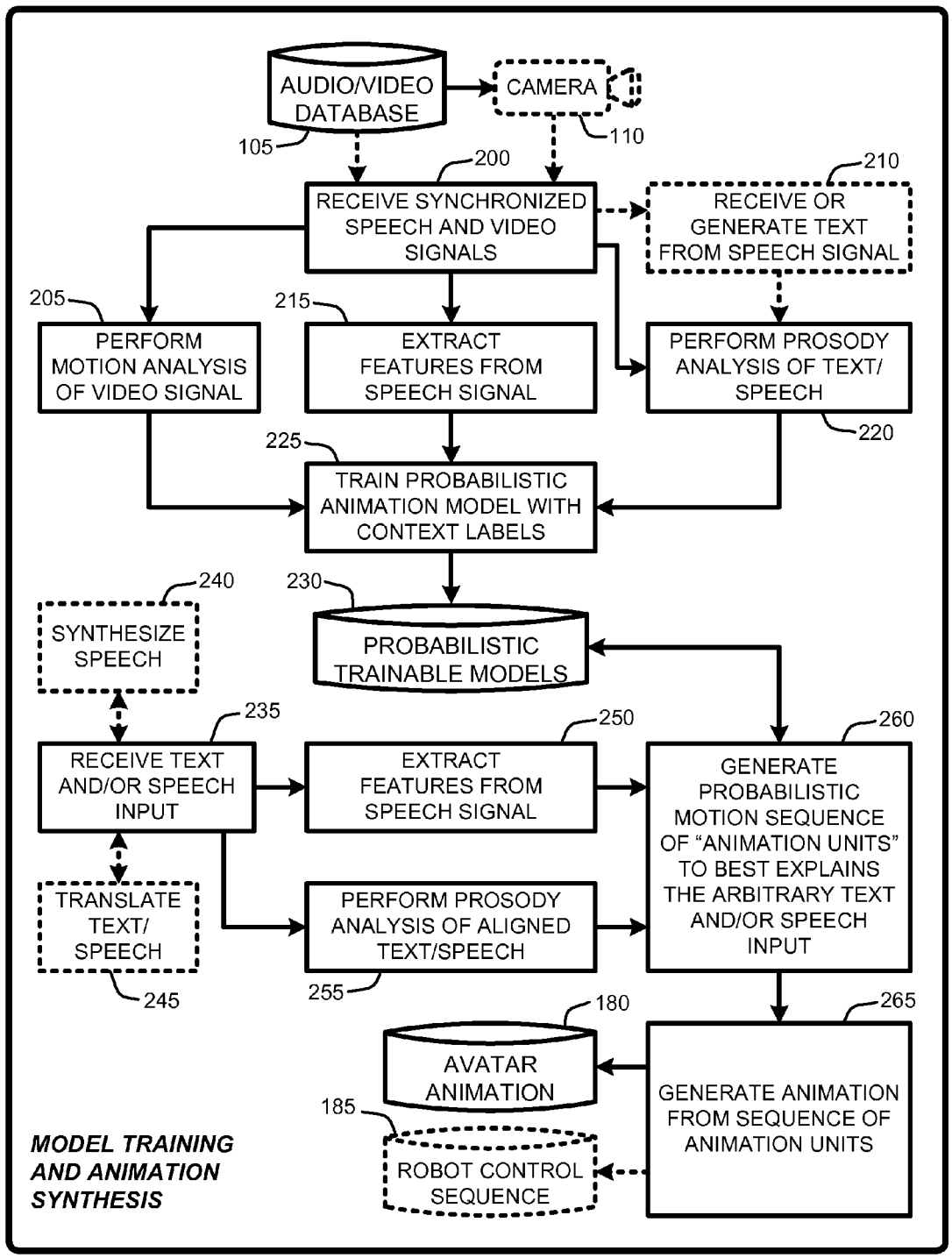
FIG. 2 illustrates a general system flow diagram that illustrates exemplary methods for implementing various embodiments of the Animation Synthesizer, as described herein.

3.0 Operational Summary of the Animation Synthesizer:

The processes described above with respect to FIG. 1 and in further view of the detailed description provided above in Sections 1 and 2 are illustrated by the general operational flow diagram of FIG. 2. In particular, FIG. 2 provides an exemplary operational flow diagram that summarizes the operation of some of the various embodiments of the Animation Synthesizer-based techniques described above. Note that FIG. 2 is not intended to be an exhaustive representation of all of the various embodiments of the Animation Synthesizer-based techniques described herein, and that the embodiments represented in FIG. 2 are provided only for purposes of explanation.

Further, it should be noted that any boxes and interconnections between boxes that are represented by broken or dashed lines in FIG. 2 represent optional or alternate embodiments of the Animation Synthesizer-based techniques described herein, and that any or all of these optional or alternate embodiments, as described below, may be used in combination with other alternate embodiments that are described throughout this document.

In general, as illustrated by FIG. 2, the Animation Synthesizer begins operation by training one or more probabilistic models 230. More specifically, training of the probabilistic model 230 begins by receiving 200 a synchronized speech and video signal from a database 105 or live input via a video camera 110 or other audio/video input device.

The synchronized speech and video signal is then processed to perform 205 motion analysis of a video portion of the synchronized speech and video signal to extract motion components of the synchronized speech and video signal for various body parts. In general, as discussed in Section 2.2, the various body parts, e.g., mouth, nose, eyes, eyebrows, ears, face, head, fingers, hands, arms, legs, etc., are separately analyzed 205 using either the same or separate inputs of synchronized speech and video signals to provide an input for creating one or more probabilistic models 230.

In addition to analyzing 205 and extracting the motion components of the synchronized speech and video signal for various body parts, in various embodiments, the Animation Synthesizer also receives 210 or generates a text signal that corresponds to the speech portion of the synchronized speech and video signal by processing the speech signal using speech-to-text recognition techniques. Then, given the speech portion of the synchronized speech and video signal, the Animation Synthesizer extracts 215 various acoustic features from the speech signal as described in Section 2.2. Note that these features are generally the same features that are extracted from the speech input used for animation synthesis. A speech prosody analysis 220 is also performed by analyzing the speech and any text associated with that speech.

The information extracted from the synchronized speech and video signal, including the speech prosody information, speech acoustic features, speech duration characteristics, and body part motions as a function of synchronized speech are then used to learn or train 225 the probabilistic animation model with context labels for each learned or probabilistic animation unit. As discussed above, motion training is performed at various levels (e.g., sentences (or multiple sentences), phrases, words, phonemes, sub-phonemes, etc.) for different body parts (e.g., mouth, nose, eyes, eyebrows, ears, face, head, fingers, hands, arms, legs, etc.). Once trained, the Animation Synthesizer stores the probabilistic model or models 230 to a computer-readable medium for later use. However, new models 230 can learned at any time by processing additional synchronized speech and video signals, and existing models can be refined or further trained by either adjusting model parameters or providing additional inputs of synchronized speech and video signals.

Once the probabilistic model 230 has been trained, animation synthesis operations can be performed for arbitrary inputs of text and or speech. In particular, the animation synthesis processes of the Animation Synthesizer begin operation by receiving 235 an arbitrary text or speech input. As discussed in Section 2.3, speech inputs can be synthesized 240 from any speech or text input to create a speech input signal for animation synthesis. Further, translations 245 from language to another can also be made from any speech or text input to create a speech input signal for animation synthesis.

Therefore, given an arbitrary speech signal for animation synthesis, the Animation Synthesizer processes that speech signal to extract 250 various acoustic features from the speech signal as described in Section 2.2 and 2.4. Note that these features are generally the same features that are extracted from the speech signal used for model 230 training. A speech prosody analysis 255 is also performed by analyzing the speech signal for animation synthesis and any text associated with that speech. Again, the prosody analysis 255 of the speech signal for animation synthesis returns the same information elements that are extracted from the speech signal used for model 230 training.

Once the speech input signal for animation synthesis has been processed to extract the above-described information, the Animation Synthesizer generates 260 a probabilistic motion sequence, comprised of a sequence of animation units from the probabilistic model 230, which best explains the arbitrary speech signal for animation synthesis. In other words, the probabilistic model 230 is used in combination with the information extracted from the arbitrary speech signal that was input or synthesized for animation synthesis to predict what motions would most likely correspond to the arbitrary speech signal based on the original training of the probabilistic model. The Animation Synthesizer then uses the resulting sequence of animation units to generate 265 an animation sequence. Note that in the case that speech duration information is considered, the Animation Synthesizer will temporally scale the animation units, by either speeding up or slowing down those motions to correspond to the duration of the various elements of the arbitrary speech signal that was input or synthesized for animation synthesis. Finally, the animation is used to provide an avatar animation 180, or a robot control sequence, as discussed in detail in section 2.4.

Figure 3:
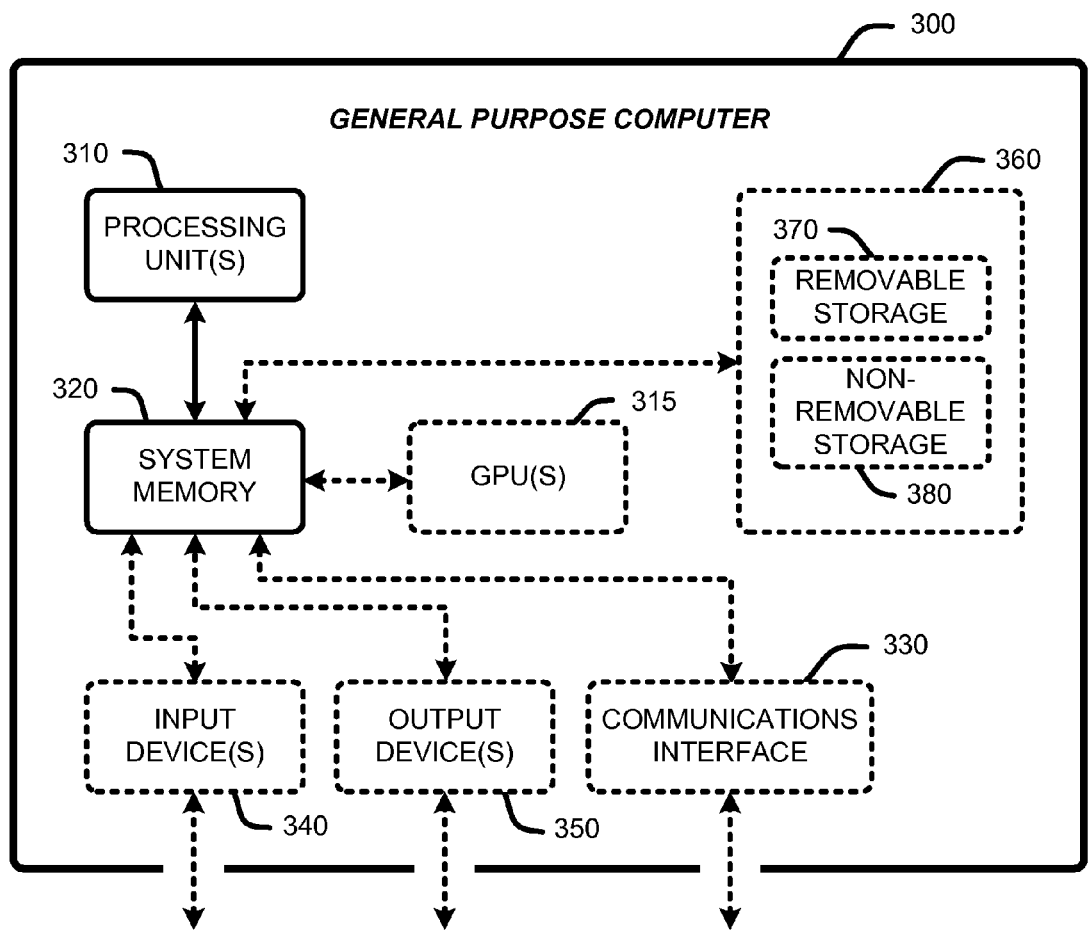
FIG. 3 is a general system diagram depicting a simplified general-purpose computing device having simplified computing and I/O capabilities for use in implementing various embodiments of the Animation Synthesizer, as described herein.

4.0 Exemplary Operating Environments:

The Animation Synthesizer-based techniques described herein are operational within numerous types of general purpose or special purpose computing system environments or configurations. FIG. 3 illustrates a simplified example of a general-purpose computer system on which various embodiments and elements of the Animation Synthesizer, as described herein, may be implemented. It should be noted that any boxes that are represented by broken or dashed lines in FIG. 3 represent alternate embodiments of the simplified computing device, and that any or all of these alternate embodiments, as described below, may be used in combination with other alternate embodiments that are described throughout this document.

For example, FIG. 3 shows a general system diagram showing a simplified computing device. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, video media players, etc.

At a minimum, to allow a device to implement the Animation Synthesizer, the device must have some minimum computational capability along with some way to access or input text or speech inputs and one or more probabilistic motion models trained on one or more speech/motion inputs, as described above. In particular, as illustrated by FIG. 3, the computational capability is generally illustrated by one or more processing unit(s) 310, and may also include one or more GPUs 315. Note that that the processing unit(s) 310 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 3 may also include other components, such as, for example, a communications interface 330. The simplified computing device of FIG. 3 may also include one or more conventional computer input devices 340. The simplified computing device of FIG. 3 may also include other optional components, such as, for example one or more conventional computer output devices 350. Finally, the simplified computing device of FIG. 3 may also include storage 360 that is either removable 370 and/or non-removable 380. Note that typical communications interfaces 330, input devices 340, output devices 350, and storage devices 360 for general-purpose computers are well known to those skilled in the art, and will not be described in detail herein.

The foregoing description of the Animation Synthesizer has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Animation Synthesizer. It is intended that the scope of the invention be limited not by this detailed description, but rather by the claims appended hereto.

What is claimed is:

1. A method for synthesizing animation motions, comprising steps for:

providing a set of one or more animation models, each animation model providing a set of probabilistic motions of one or more body parts learned from acoustic features and speech prosody information extracted from a set of one or more audio/video training signals comprising synchronized speech and body motions;

wherein the probabilistic motions of the animation models are constructed as individual "animation units" by modeling Euler angles of each modeled body part as a function of corresponding acoustic features and speech prosody information and generating full context labels for each animation unit;

wherein two or more of the animation models are clustered using predictive analysis techniques to allow selection of animation units from multiple animation models to ensure that a smooth animation trajectory can be constructed from any selected animation units;

receiving an arbitrary speech input synthesized from an arbitrary text input including one or more "emotion tags" associated with one or more portions of the arbitrary text input, said emotion tags being used to change emotional characteristics of the synthesized arbitrary speech input;

evaluating the speech input to extract a set of acoustic features and speech prosody information from the speech input;

predicting a sequence of the probabilistic motions to construct an animation trajectory which best explains the arbitrary speech input, by applying one or more of the set of animation models to the set of acoustic features and speech prosody information extracted from the arbitrary speech input; and generating an animation sequence from the predicted sequence of the probabilistic motions.

2. The method of claim 1 wherein the animation sequence is used to construct an audio/video animation of an avatar, said animation including the arbitrary speech input synchronized to the animation sequence.

3. The method of claim 1 wherein the animation sequence is used to construct a robot control sequence, said robot control sequence including the arbitrary speech input synchronized to robotic motions corresponding to the animation sequence.

4. The method of claim 1 wherein the acoustic features and speech prosody information includes one or more of speech F0 measurements, speech energy measurements, speech timing measurements, part-of-speech, and speech semantics.

5. The method of claim 1 wherein each of the probabilistic motions correspond to one or more separate speech levels, including sentences, phrases, words, phonemes, and sub-phonemes.

6. The method of claim 1 wherein each of the probabilistic motions include one or more of a mouth, nose, eyes, eyebrows, ears, face, head, fingers, hands, arms, legs, feet, torso, spine, and skeletal elements of a body.

7. The method of claim 1 further comprising translating the arbitrary text input from a first language to a second language prior to synthesizing the arbitrary speech input from the translated arbitrary text input.

8. The method of claim 1 wherein the arbitrary speech input is synthesized from a real speech input of a user.

9. A system for generating audio/video animations from an arbitrary speech input, comprising:
a device for training one or more probabilistic motion models from one or more audio/video training signals comprising synchronized speech and body part motions;
wherein training each probabilistic motion model further comprises learning a set of animation units corresponding to actual motions of specific body parts relative to acoustic features and speech prosody information extracted from one or more of the audio/video training signals;
wherein the animation units are constructed by modeling Euler angles of each modeled body part as a function of corresponding acoustic features and speech prosody information and generating full context labels for each animation unit;
wherein two or more of the probabilistic motion models are clustered using predictive analysis techniques to allow selection of animation units from multiple probabilistic motion models to ensure that a smooth animation trajectory can be constructed from any selected animation units;
a device for receiving an arbitrary text input having one or more "emotion tags" associated with one or more portions of the arbitrary text input;
a device for synthesizing an arbitrary speech input from the from the arbitrary text input, and wherein the emotion tags are used to change emotional characteristics of the associated portions of the synthesized arbitrary speech input;
a device for extracting a set of acoustic features and speech prosody information from the arbitrary speech input;
a device for predicting a sequence of the animation units to construct an animation trajectory which probabilistically explains the arbitrary speech input, by applying one or more of the set of motion models to the set of acoustic features and speech prosody information extracted from the arbitrary speech input;
a device for generating an animation sequence from the predicted sequence of the animation units; and
a device for constructing an audio/video animation of an avatar, said animation including the arbitrary speech input synchronized to the animation sequence.

10. The system of claim 9 wherein each of the animation units correspond to one or more separate speech levels, including sentences, phrases, words, phonemes, and sub-phonemes.

11. The system of claim 9 further comprising a device for translating the arbitrary text input from a first language to a second language prior to synthesizing the arbitrary speech input from the translated arbitrary text input.

12. The system of claim 9 further comprising one or more multi-point video conferencing devices, wherein each of two or more users is represented to each of one or more other users by a real-time audio/video animation of an avatar generated from real-time arbitrary speech inputs of each corresponding user.

13. A computer-readable medium, not comprising modulated data signals and carrier waves, having computer executable instructions stored therein for constructing an audio/video animation of an avatar as a function of an arbitrary text input, said instructions comprising:
learning one or more probabilistic motion models from one or more audio/video training signals, wherein each audio video training signal includes synchronized speech and body part motions of a human speaker;
wherein learning each probabilistic motion model further comprises learning a set of animation units corresponding to actual motions of specific body parts of the human speaker as a predictive function of acoustic features and speech prosody information extracted from one or more of the audio/video training signals;
wherein the animation units are constructed by modeling Euler angles of each modeled body part as a function of corresponding acoustic features and speech prosody information and generating full context labels for each animation unit;
wherein two or more of the probabilistic motion models are clustered using predictive analysis techniques to allow selection of animation units from multiple probabilistic motion models to ensure that a smooth animation trajectory can be constructed from any selected animation units;
receiving an arbitrary text input including one or more "emotion tags" associated with one or more portions of the arbitrary text input;

synthesizing a speech signal from the arbitrary text input, and wherein the emotion tags are used to change emotional characteristics of the associated portions of the synthesized speech signal;

extracting a set of acoustic features and speech prosody information from the synthesized speech signal;

predicting a sequence of the animation units to construct an animation trajectory which probabilistically explains the synthesized speech signal, by applying one or more of the set of motion models to the set of acoustic features and speech prosody information extracted from the synthesized speech signal; and constructing an audio/video animation of an avatar from the predicted sequence of the animation units;

said animation including the synthesized speech signal synchronized to the animation.

14. The computer-readable medium of claim 13 wherein each of the animation units correspond to one or more separate speech levels, including sentences, phrases, words, phonemes, and sub-phonemes.

15. The computer-readable medium of claim 13 wherein the arbitrary text input is translated from a first language to a second language prior to synthesizing the speech signal.

16. The computer-readable medium of claim 13 wherein the arbitrary text input is extracted from an email message, and wherein the audio/video animation of the avatar represents a digital avatar speaking the text of the email message while exhibiting body part motions corresponding to animation units modeled after one or more real human speakers.

* * * * *